US009092547B2

(12) United States Patent
Lamba et al.

(10) Patent No.: US 9,092,547 B2
(45) Date of Patent: Jul. 28, 2015

(54) TRANSFORMING A GRAPH TO A TREE IN ACCORDANCE WITH ANALYST GUIDANCE

(71) Applicant: Wal-Mart Stores, Inc., Bentonville, AR (US)

(72) Inventors: Digvijay Singh Lamba, Sunnyvale, CA (US); Omkar Deshpande, Mountain View, CA (US)

(73) Assignee: Wal-Mart Stores, Inc., Bentonville, AK (US)

( * ) Notice: Subject to any disclaimer, the term of this patent is extended or adjusted under 35 U.S.C. 154(b) by 307 days.

(21) Appl. No.: 13/622,975

(22) Filed: Sep. 19, 2012

(65) Prior Publication Data

US 2014/0082022 A1 Mar. 20, 2014

(51) Int. Cl.
*G06F 7/00* (2006.01)
*G06F 17/30* (2006.01)

(52) U.S. Cl.
CPC .... *G06F 17/30958* (2013.01); *G06F 17/30961* (2013.01)

(58) Field of Classification Search
CPC .................................................. G06F 17/30961
USPC .................................................. 707/777, 797
See application file for complete search history.

(56) References Cited

U.S. PATENT DOCUMENTS

| | | | | |
|---|---|---|---|---|
| 5,590,250 | A * | 12/1996 | Lamping et al. | 345/427 |
| 5,701,137 | A | 12/1997 | Jancke | |
| 5,895,474 | A | 4/1999 | Maarek | |
| 6,108,698 | A | 8/2000 | Tenev | |
| 6,931,625 | B1 | 8/2005 | Coad | |
| 7,181,684 | B2 | 2/2007 | Chittu | |
| 7,644,085 | B2 | 1/2010 | Miller | |
| 7,661,076 | B2 | 2/2010 | Seemann | |
| 7,814,427 | B2 * | 10/2010 | Cook et al. | 715/763 |
| 8,296,722 | B2 | 10/2012 | Yoshihama | |
| 8,620,922 | B2 * | 12/2013 | Bird et al. | 707/740 |
| 2003/0218641 | A1 | 11/2003 | Longobardi | |
| 2004/0239683 | A1 | 12/2004 | Chu | |
| 2006/0037019 | A1 | 2/2006 | Austin | |
| 2006/0150169 | A1 | 7/2006 | Cook | |
| 2007/0294289 | A1 * | 12/2007 | Farrell | 707/103 R |
| 2008/0177531 | A1 * | 7/2008 | Nakagawa | 704/9 |
| 2009/0235285 | A1 * | 9/2009 | Kim et al. | 719/328 |
| 2011/0040766 | A1 * | 2/2011 | Robinson et al. | 707/749 |
| 2011/0295895 | A1 | 12/2011 | Musgrove | |

FOREIGN PATENT DOCUMENTS

WO WO2010039893 A2 4/2010

* cited by examiner

*Primary Examiner* — Charles Lu
(74) *Attorney, Agent, or Firm* — Bryan Cave LLP

(57) ABSTRACT

Methods are disclosed for converting a directed graph to a taxonomy using guidelines from a user. An initial tree is output from a first pruning step in which subtree preferences (and other weights) are applied to preserve or remove paths from a node to one or more levels of descendent nodes. Subtree preferences (and infoboxes) may specify rules for automatically generating recommendations during application to nodes. In a second pruning step, the directed graph is again processed with additional weightings applied to edges in the graph in accordance with the recommendations. The recommendations may be human defined. Recommendations may specify a recommended ancestor for a particular node and may include a weighting to be applied to the recommendation itself, if there are multiple conflicting recommendations for the same node. Recommendations may also specify what standard weight to apply to the edge of the best parent.

24 Claims, 6 Drawing Sheets

TRANSFORMING A GRAPH TO A TREE IN ACCORDANCE WITH ANALYST GUIDANCE

RELATED APPLICATIONS

This application claims priority to U.S. Provisional Application Ser. No. 61/695,274 filed Aug. 30, 2012, which is hereby incorporated herein by reference.

BACKGROUND

1. Field of the Invention

This invention relates to systems and methods for transforming an arbitrary graph into a spanning tree, such as a rooted and directed spanning tree, with means for providing guidance regarding preservation and pruning of paths in the graph.

2. Background of the Invention

Many data sets are structured as directed graphs, wherein nodes can be linked to any other node without regard to a hierarchical structure. For example, Internet websites or any corpus of hyperlinked documents can include links to and from one another without regard to any hierarchical structure.

Algorithms exist for converting directed graphs to spanning trees, such as a rooted and directed spanning tree. For example, a taxonomy may often be in the form of a rooted and directed spanning tree. In particular, these algorithms seek to find a maximum or minimum number of optimum branchings. Examples of such an algorithm include the Edmonds algorithm and the Chu-Liu/Edmunds algorithm. These algorithms take into account the structure of the graph, but they cannot take advantage of relationships and preferences that require human judgment or insight.

Of course, one could manually transform a directed graph into a spanning tree, such as a rooted and directed spanning tree, by tediously inspecting each node and deciding which paths to preserve and which to omit. However, this process may be impossible for large graphs.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
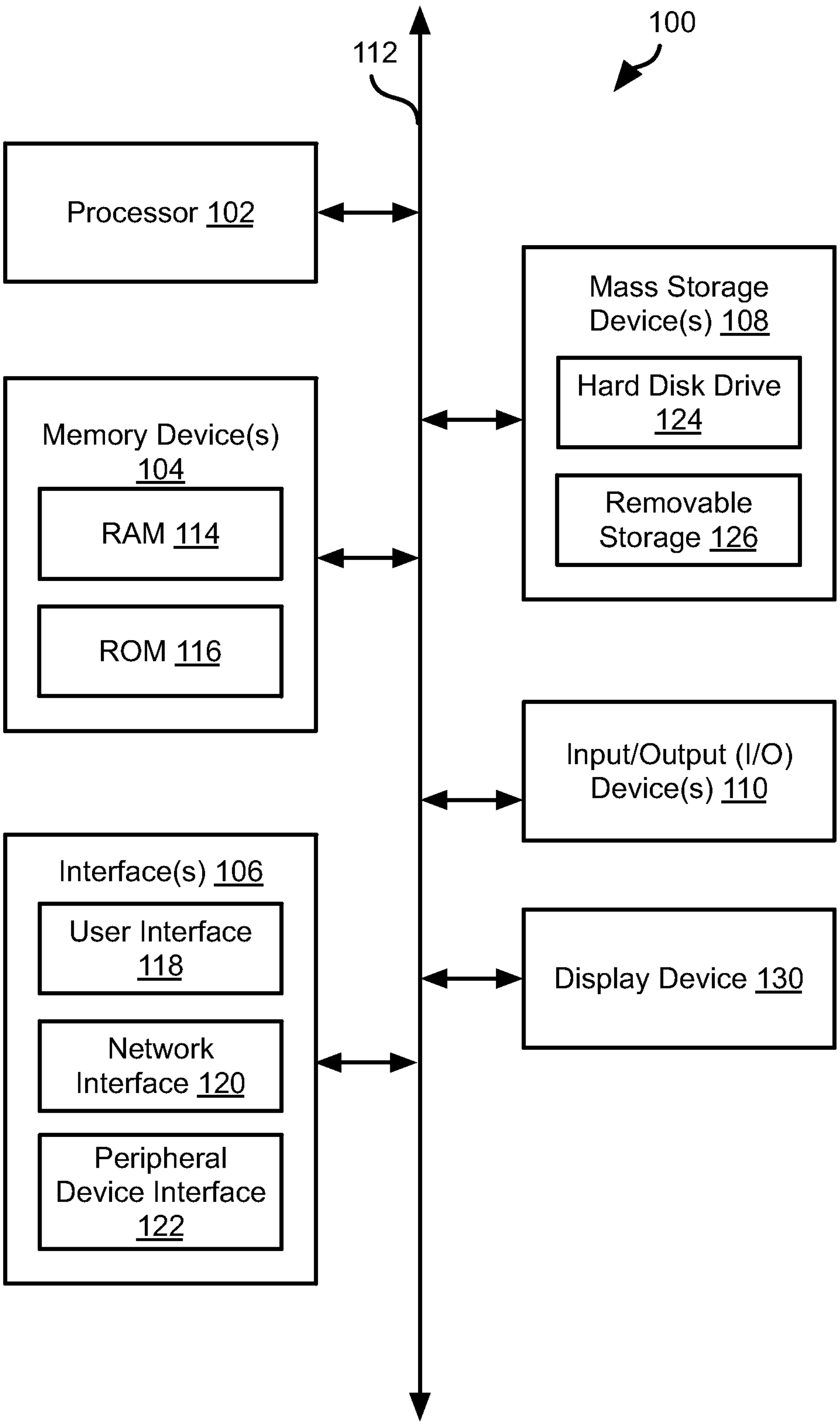
FIG. 1 is a block diagram of a computing device suitable for implementing embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for transforming a graph into a taxonomy using analyst guidance.

Paths of a directed graph are pruned to yield an initial tree. Pruning may be in accordance with a branch optimization algorithm, such as the Edmunds algorithm. The first pruning step may take into account human-specified subtree preferences that specify treatment for paths forming a base node to one or more levels of descendent nodes. In a second iteration, the directed graph is again analyzed with weightings applied to edges within the graph in accordance with recommendations. The recommendations are evaluated with respect to the initial tree to select or weight specific edges between a node and its immediate parent. The recommendations may be human-generated or generated automatically in conjunction with the processing of a subtree preference. Recommendations are also generated based on infoboxes. Infobox names are mapped to specific ancestors, and all concepts associated with those infobox names get recommended to the respective ancestors. Similarly, infobox names can be assigned a subtree preference (they are generally assigned with a negative subtree preference, as infobox names appear on article pages that are entities, and entities are not good parents in a taxonomy), and all concepts having those particular infobox names would get assigned that subtree preference. The subtree preferences may also be automatically generated based on attributes of the nodes of the graph.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine. These instructions will then execute via the processor of the computer or other programmable data processing apparatus and create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130, all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and the like. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be entered into or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (such as mice or track pads), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, or USB bus.

For purposes of illustration, programs and other executable program components are shown herein as discrete blocks, although it is understood that such programs and components may reside at various times in different storage components of computing device 100, and that these programs and components are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
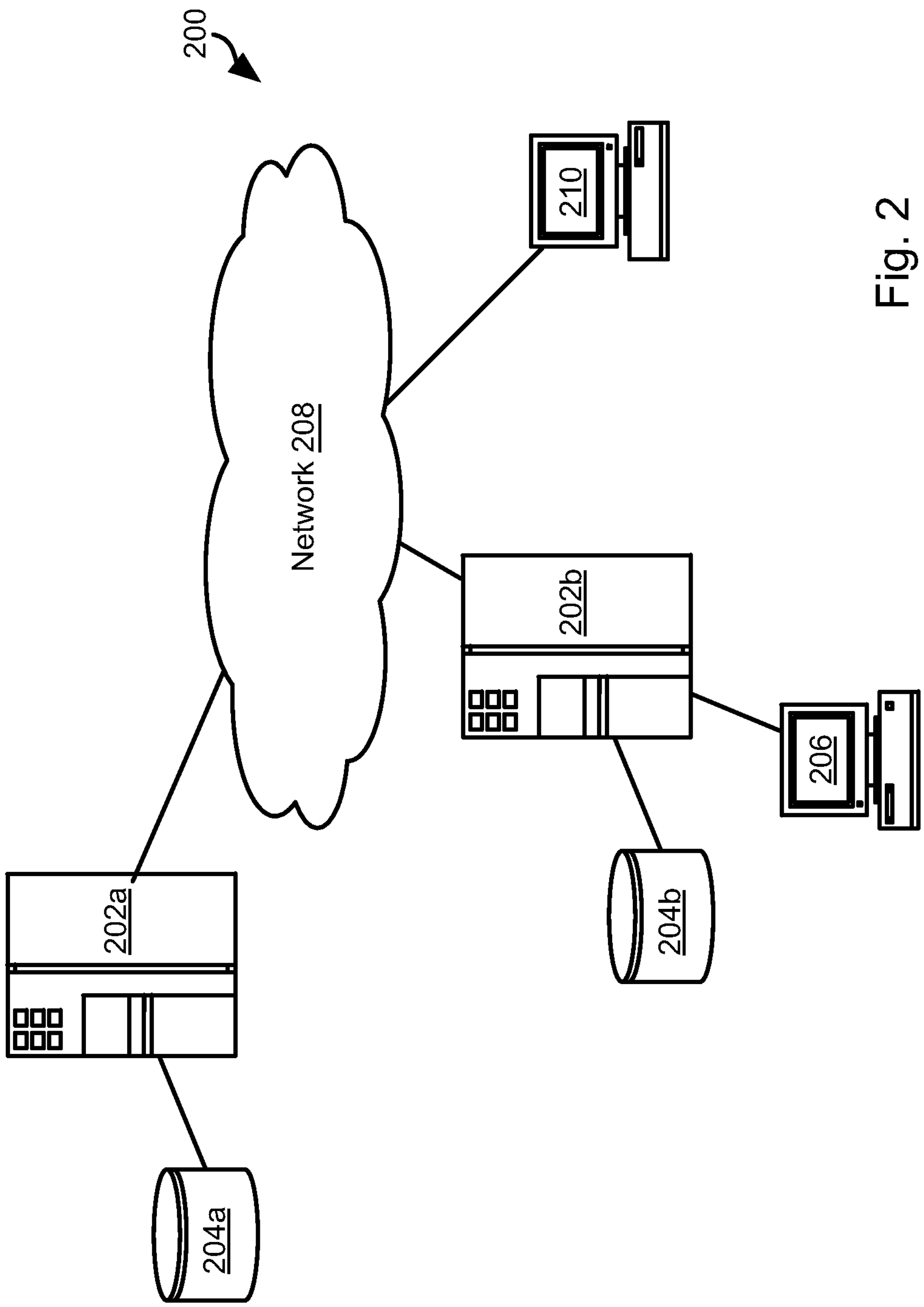
FIG. 2 is a block diagram of a network environment suitable for implementing embodiments of the present invention.

FIG. 2 illustrates an example of a computing environment 200 suitable for implementing the methods disclosed herein. In some embodiments, a server 202*a* provides access to a database 204*a* in data communication therewith. The database 204*a* may store a directed graph. For example, the database 204*a* may store the Wikipedia™ corpus or some other corpus of documents hyperlinked to one another to define a directed graph. The server 202*a* may provide access to the database 204*a* to various users. For example, the server 202*a* may implement a web server for receiving requests for data stored in the database 204*a* and formatting requested information into web pages. The web server may additionally be operable to receive information and store the information in the database 204*a*. Although a single database 204*a* and server 202*a* are shown, the data accessed by users may be distributed across multiple databases 204*a* and accessed by means of multiple servers 202*a*.

A server 202*b* may be associated with another entity providing information services, such as responses to queries for information. The server 202*b* may be in data communication with a database 204*b*. The database 204*b* may store information for use in responding to queries. In particular, the database 204*b* may store a taxonomy obtained through a transformation of the directed graph from the databases 204*a*. In some embodiment, both the directed graph and taxonomy are generated by the same entity and stored and accessed using the same hardware. An operator may access the server 202*b* by means of a workstation 206, that may be embodied as any general purpose computer, tablet computer, smart phone, or the like.

The server 202*a* and server 202*b* may communicate with one another over a network 208 such as the Internet or some other local area network (LAN), wide area network (WAN), virtual private network (VPN), or other network. A user may access data and functionality provided by the servers 202*a* and 202*b* by means of a workstation 210 in data communication with the network 208. The workstation 210 may be embodied as a general purpose computer, tablet computer, smart phone or the like. For example, the workstation 210 may host a web browser for requesting web pages, displaying web pages and receiving user interaction with web pages, and performing other functionality of a web browser. The workstation 210, workstation 206, servers 202*a* and 202*b*, and databases 204*a* and 204*b* may have some or all of the attributes of the computing device 100.

Figure 3:
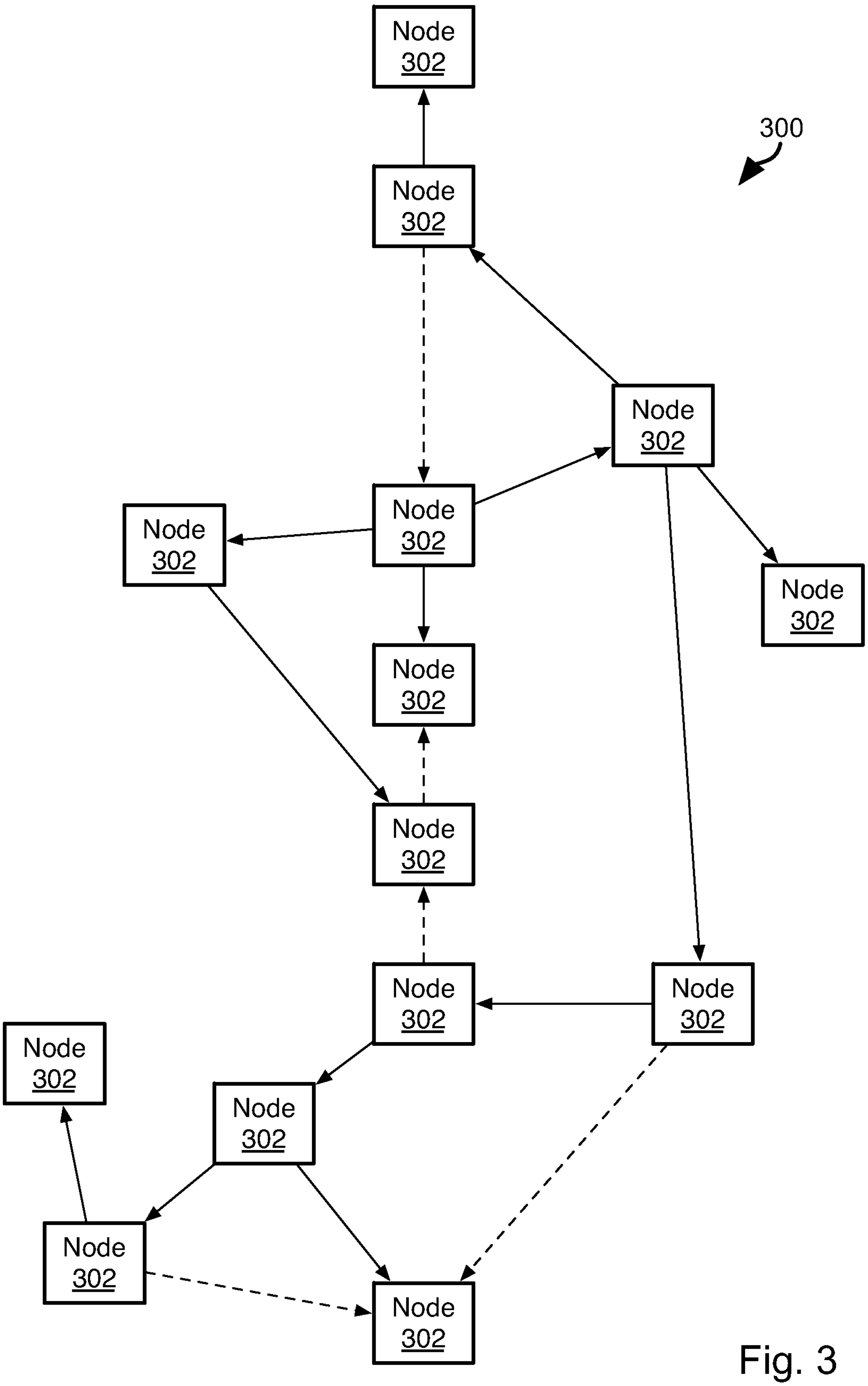
FIG. 3 is a block diagram of a directed graph pruned to achieve a taxonomy.

Referring to FIG. 3, a directed graph 300 may include various nodes 302. The nodes 302 may represent documents with links to other nodes 302. The nodes 302 may represent any data structure for which a relationship can be defined to another data structure embodied as a node 302. As shown in FIG. 3, an individual node may have multiple parent nodes and also be a parent to multiple nodes. To form a taxonomy, connections, shown by dotted lines, may be pruned according to an algorithm in order to form a tree structure in which each node 302 has a single parent node. The algorithms disclosed herein provide a novel approach for deciding which connections or relationships to remove or otherwise ignore in order to obtain a taxonomy. In particular, the algorithms described herein enable human input to guide the process of pruning the directed graph, without requiring tedious inspection of each node 302 and its relationships to other nodes.

Figure 4:
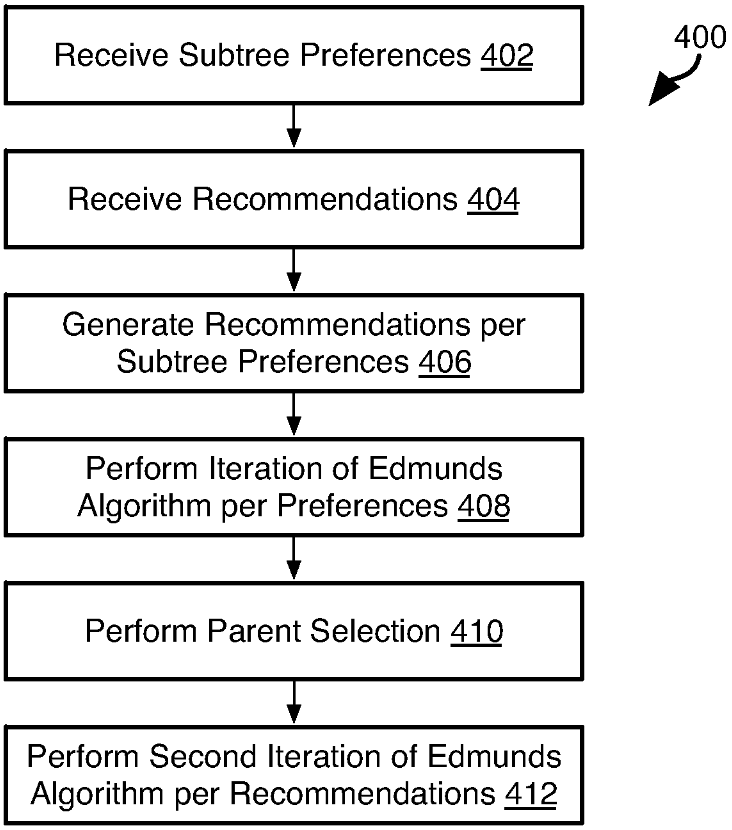
FIG. 4 is a process flow diagram of a method for converting a directed graph to a taxonomy in accordance with an embodiment of the present invention.

FIG. 4 illustrates a method 400 for converting a directed graph to a taxonomy. The methods disclosed herein are particularly suitable for use with the corpus of documents forming the Wikipedia™ encyclopedia. Accordingly, references to implementation details using specific details of Wikipedia™ are used throughout. However, as already noted, the methods disclosed herein find application with respect to any graph structure.

The method 400 may include receiving 402 subtree preferences. The subtree preferences may be specified by a human and indicate a preference as to how the descendants of specific nodes are to be treated. In this manner, human judgment regarding the pruning of branches in an entire region of the graph may be specified. Subtree preferences may also be automatically generated. The parameters for automatically generating subtree preferences may be specified by a human. For example, a corpus of documents may include documents that represent articles about a specific entity, where it is not ideal for that page to be a parent of documents included in links of the document. Accordingly, a negative subtree preference may be specified for this type of document. The subtree preferences may be automatically generated based on detection of attributes of the document. Any type of document may have a negative or positive subtree preference specified and the attributes used to detect whether a document is of a given type may be any attribute specified by a developer or user.

Using the example of Wikipedia™, some pages for specific entities, e.g., specific famous people, animal species, and the like, include an "infobox" that includes a summary of relevant facts for the entity. Accordingly, upon detecting such an infobox in an article, or a certain type of infobox, a negative subtree preference may be automatically generated for the descendants of that article.

Recommendations 404 may also be received. Recommendations 404 specify human judgment as to which node would be a suitable ancestor for specific nodes or nodes of a certain type or class. In some embodiments, recommendations are automatically generated 406 based on a graph and the subtree preferences, or they are based on analysis of specific nodes of the graph as described hereinbelow. In some embodiments, recommendations are generated 406 according to attributes of nodes in the graph. For example, where nodes are documents having common formatting rules or content, recommendations may be generated based on attributes of the documents. Using the example of Wikipedia™, articles may have infoboxes associated therewith. There may be a limited number of infobox types, with each infobox of a certain type having common information types. Accordingly, recommendations may be generated by receiving a user specification of an infobox type and a recommended ancestor for infoboxes of the specified type. The recommendation may also specify a weight to be applied to the edges leading to the recommended ancestor, as discussed below.

A first iteration of a branch optimization algorithm may be performed 408 with respect to the graph using the subtree preferences and any other specified weights. For example, the Edmunds algorithm may be used to prune branches of the graph to output an initial tree. The operation of the Edmunds algorithm may be constrained or biased based on the subtree preferences. That is, branches or relationships of the graph to which a subtree preference applies may be constrained to be preserved, constrained to be removed, or weighted toward preservation or removal according to the definition of the subtree preference. Accordingly, the operation of the branch optimization algorithm may be altered to follow these preferences.

The output of step 408 may be an initial tree pruned according to both the branch optimization algorithm and the subtree preferences. For example, the input directed graph may be pruned according to an algorithm with the weighting of specific edges in accordance with the subtree preferences. For example, a specific edge may have a vector including both weights computed according to the pruning algorithm as well as weights computed according to subtree preferences. This vector may then be used to decide which of a number of candidate edges to preserve, and which of those edges to prune when cycles in the graph have to be broken by removing the specific edges making up those cycles.

A parent selection step 410 may then be performed based on the original graph and the initial tree. As discussed in detail below, in the parent selection step 410, immediate parents of a node are selected according to recommendations and the structure of the initial tree.

The initial tree may then be adjusted or otherwise modified by performing 412 a second iteration of the branch optimization algorithm, such as the Edmunds algorithm. However, performing 412 the second iteration may take into account the selection of immediate parents according to the parent selection step 410 using the recommendations, either manually or automatically generated. Specifically, the branch optimization algorithm may be biased toward preserving or removing paths in the directed graph in accordance with the recommendations. For example, paths in the graph may be weighted in accordance with the recommendations and the branch optimization may use these weightings to determine which branches of the graph to prune to arrive at the taxonomy. As described hereinbelow, the recommendations may take as input both one or more attributes of nodes of the graph and the initial tree as output from performance 408 of the first iteration.

The output from performance 412 of the second iteration is a taxonomy that may then be used to respond to queries or otherwise take advantage of the data stored in the taxonomy and the way in which it is organized.

Figure 5:
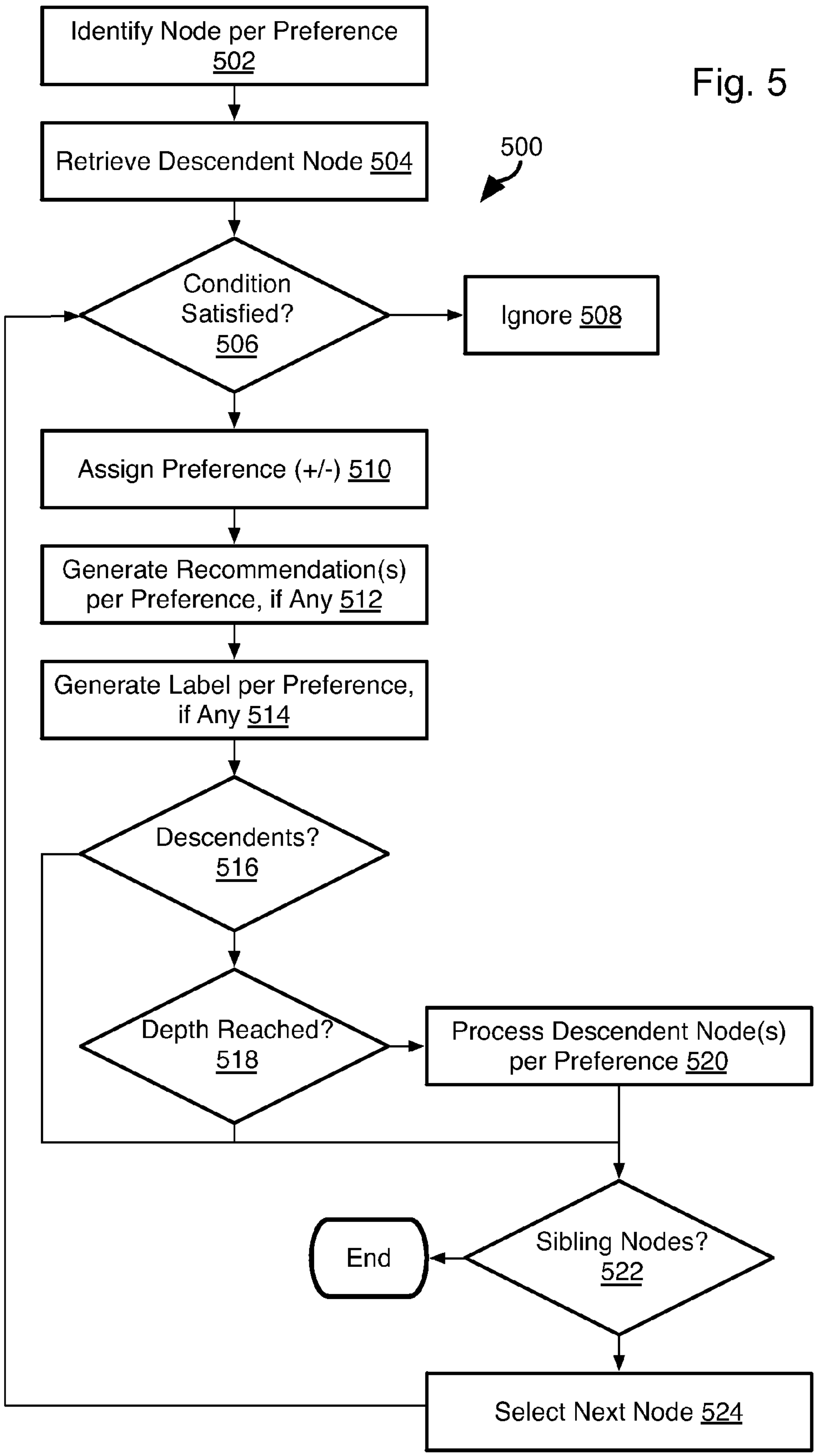
FIG. 5 is a process flow diagram of a method for implementing subtree preferences in conversion of a directed graph to a spanning tree in accordance with an embodiment of the present invention.
Figure 6:
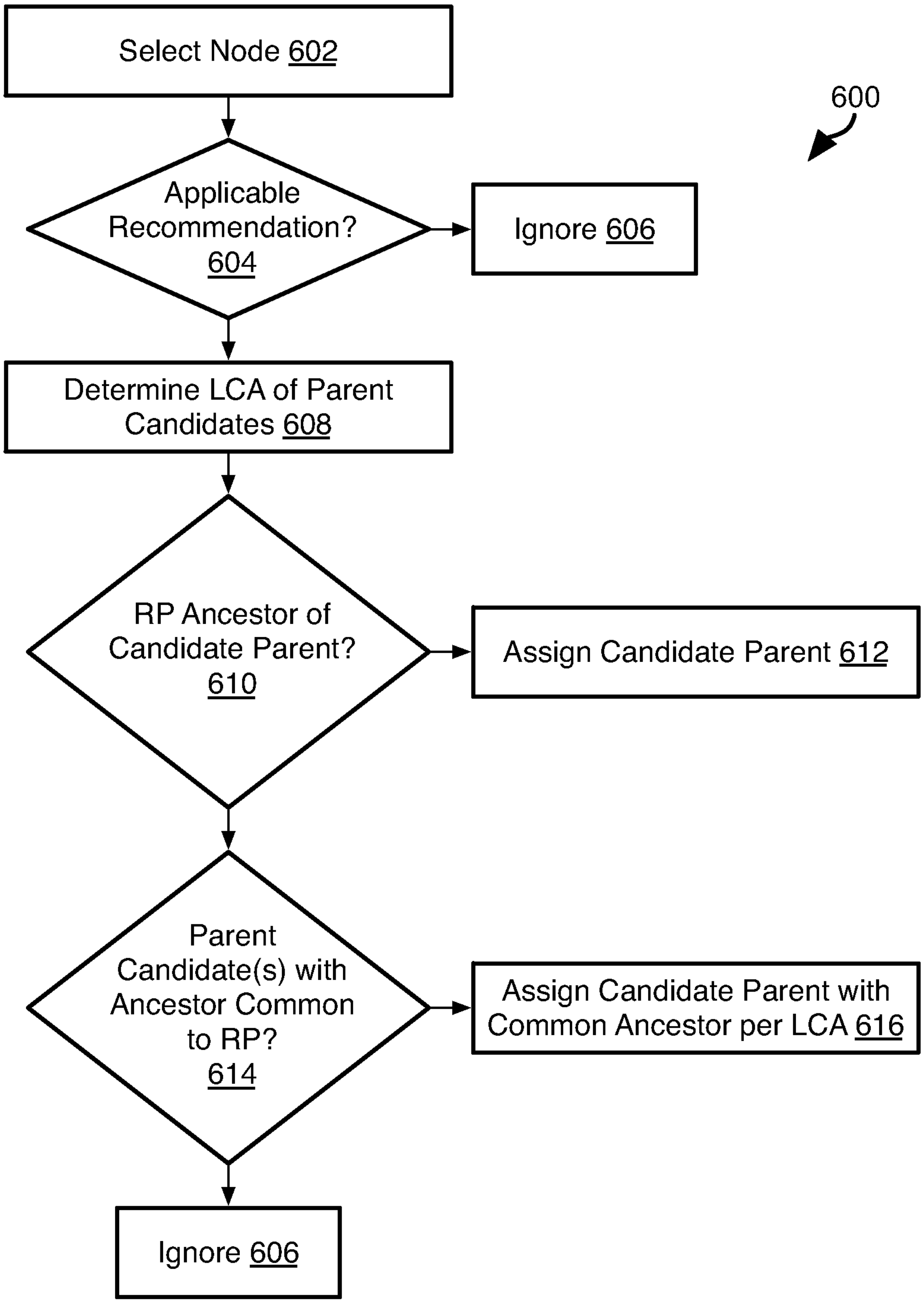
FIG. 6 is a process flow diagram of a method for implementing recommendations in conversion of a directed graph to a spanning tree, such as a rooted and directed spanning tree, in accordance with an embodiment of the present invention.

FIGS. 5 and 6 illustrate methods for implanting subtree preferences and recommendations, respectively, as mentioned with respect to the method 400 of FIG. 4. Referring specifically to FIG. 5, a subtree preference may be applied according to the illustrated method 500. Subtree preferences may be human defined and may include various parameters. For example, a subtree preference may be of the form <category>|<polarity>|<depth>|<Boolean expression>|<recommended ancestor>|<marker>. In some instances, a subtree preference may include less than all of these fields defined and the order of these fields in the specification of a subtree preference may vary according to developer preference.

The method 500 may be used to evaluate the fields of a subtree preference in order to weight edges of a graph for use in branch selection according to a branch optimization algorithm such as the Edmunds algorithm. For example, the method 500 may include identifying 502 a node of a graph, hereafter a "base" node, for which a subtree preference is defined. For example, the <category> field may identify a base node or group of base nodes. As noted above, a benefit of the methods disclosed herein is the ability to apply human input to large amounts of data. Accordingly, the <category> field may advantageously refer to a base node having a large number of child nodes as opposed to a leaf node with no child nodes. However, a leaf node may be referenced in the <category> field as desired by a user.

A descendent node of the base node may be retrieved and evaluated 506 to determine whether the descendent node satisfies the <Boolean expression> field. In some embodiments, the <Boolean expression> field specifies a required relationship between the base node and the descendent node. The <Boolean expression> field may include any logical functions including AND, OR, NOT, XOR, NAND, NOR, or the like. The variables in the logical function may be attributes of the descendent node or attributes of the relationships of the descendent node to the base node.

For example, in a corpus of documents, documents may have a specific format with specific areas. Accordingly, a relationship between a base node and a descendent node may be defined as the area of the document corresponding to the base node in which the link to the descendent node occurs. Using the example of a Wikipedia™ page, a category page may include a "main" section, a "sub category" section, an "article" section, and the like. Accordingly, the <Boolean expression> field may indicate that the subtree preference applies to one of these sections, a combination of these sections, or expressly exclude one of these sections. As an example, a <Boolean expression> field may be defined as "wmain or warticle," where wmain and warticle refer to the "main" and "article" sections of a Wikipedia™ page. As another example, the <Boolean expression> field may be defined as "not wsubcat," where wsubcat is the "subcategory" section of the Wikipedia™ page. Any Boolean expression using any arbitrary section label or other attribute of a link to a descendent node may be used in the <Boolean expression> field.

If the descendent node is found 506 not to satisfy the <Boolean expression> field, it may be ignored 508. Ignoring 508 a path from the base node to the descendent node indicates that that path will be given no positive or negative weighting during pruning of the graph to a taxonomy, such as in a branch optimization algorithm like the Edmonds algorithm.

If the descendent node is found 506 to satisfy the <Boolean expression> field, then a preference as defined in the <polarity> field may be assigned 510 to the path from the base node to the descendent node. For example, the <polarity> field may include a 0, −1, False, or the like, to indicate a negative preference and a 1, True, or the like, to indicate a positive preference. Any variable may be used to indicate a positive or negative weighting. Paths assigned 510 a positive preference will be biased toward preservation during pruning and paths assigned 510 a negative preference will be biased toward removal during pruning.

The method 500 may further include generating 512 recommendations specified in the <recommended ancestor> field, if any. If this field is blank, step 512 may be ignored. The <recommended ancestor> field indicates a node in the graph that would be a suitable ancestor for the descendants of the base node. The function of the <recommended ancestor> field is to encourage the election of paths from the descendent node to the root node that include the node specified in the <recommended ancestor> as an ancestor. The recommended ancestor can be much higher in the hierarchy than the descendent node or may be an immediate parent of the descendant node. The recommendations generated 512 in accordance with the <recommended ancestor> field may be of the form <Y,p>, where Y is the descendent node and p is the parent specified in the <recommended ancestor> field. This recommendation will then be processed in later stages of the algorithm as described below.

In instances where the subtree preference for a base node specifies a value in the <marker> field, the descendent node may be labeled with the marker. The marker may be any value for use in later stages of algorithms disclosed herein or for use by other methods that make use of the taxonomy output from the methods disclosed herein. For example, the value in the <marker> field may specify what the descendent node is, i.e., an "is a <marker>" relationship. Other relationships may be specified as a "contains a <marker>" relationship, for example. In some embodiments, not all nodes to which a subtree preference applies may be marked according to the <marker> field. For instance, in some embodiments, only leaf nodes at the bottom of a hierarchy will be labeled according to the <marker> field. In the example of Wikipedia™, only article pages may be labeled using information from the <marker> field. In some embodiments, any and all of the fields of a subtree preference as described above may be applied only to leaf nodes, such as article pages of a Wikipedia™ corpus.

In the example of a Wikipedia™ graph, some articles include "infoboxes" with specific labels and text for articles belonging to a specific category or class. These infoboxes are helpful in identifying "is a . . . " relationships, for example, for the subject of articles. Accordingly, the <marker> field may supply or supplement this type of information for articles according to a user preference.

If the descendent node retrieved 504 is found 516 to have descendants, the method 500 may include evaluating 518 whether a depth specified in the <depth> field has been reached with respect to the base node. For example, if the <depth> field of the subtree preference includes the value of 1, only the immediate children of the base node would be processed in accordance with the subtree preference. Likewise, if the <depth> field was the value N, N levels of descendants of the base node may be processed according to the subtree preference. In some instances the <depth> field may specify unlimited depth such that all descendants of the base node are processed in accordance with the subtree preference up until a node that has been previously processed according to the subtree preference is found, i.e., a loop is encountered. In some instances, an unlimited depth is not permitted to avoid infinite loops due to the cyclical nature of the original graph.

If the depth specified in the subtree preference is not found 518 to have been reached, then descendants of the retrieved 504 descendent may likewise be processed 520 according to the subtree preference. Processing 520 may include processing descendants of the retrieved 504 descendant in accordance with the method 500, i.e., in a recursive fashion.

If siblings of the descendent node are found 522 to need processing according to the subtree preference for the base node, then a next descendent node of the base node may be selected 524 for processing and the method 500 may repeat from step 506.

The above-described functionality enables a number of tasks to be performed. For example, subtree preferences may be processed in a scripted order. Accordingly, one subtree preference may reverse some or all of the actions taken due to a previous subtree preference. As an example, suppose the grandchildren of a base node were to be assigned a preference, whereas the immediate children were to be assigned the opposite preference. Accordingly, the following subtree preferences could be applied in order with respect to the base node:

<base node>|<1>|<2>|<Boolean expression>| <recommended parent>|<marker>

<base node>|<−1>|<1>|<Boolean expression>| <recommended parent>|<marker>.

It is readily apparent that the second subtree preference reverses the preference assigned by the first subtree preference, but only to the immediate children—the depth field is 2 for the first statement but only 1 for the second statement. In a like manner, any portion of the paths assigned preferences according to one subtree preferences can be changed according to a subsequent subtree preference. This may include assigning no preference to path. For example, in some instances, there are three possible values for the <polarity> field: negative, neutral, and positive, e.g., −1, 0, and 1. A value of neutral, e.g., 0, will have the effect of neutralizing any positive or negative preference assigned according to a previously processed subtree preference.

Referring to FIG. 6, recommendations as either manually specified or generated in accordance with subtree preferences, as described above, may be processed in accordance with the illustrated method 600. The recommendations processed according to the method 600 may include recommendations automatically generated according to attributes of nodes, such as the infobox type of a Wikipedia™ article or other page. A recommendation may be of the form <node>|<ancestor>|<weight>, in any order. In some instances, the weight may be omitted and a strict constraint imposed or a standard weight applied. The <node> indicates the node in the graph to which the recommendation applies, the <ancestor> field indicates the recommended ancestor for the node, and the <weight> field indicates a weighting that will be applied to the recommendation. In some instances, multiple recommendations may apply to the same node and its immediate parents. In some embodiments, recommendations may also specify what standard weight to apply to the edge of the best parent. As each recommendation has a fixed weight, the recommendations do not need to be explicitly specified. Accordingly, the <weight> field may be used to resolve which of these recommendations will be implemented, i.e., the highest weighted recommendation for which an immediate parent satisfying the recommendation is found will be used to the exclusion of other recommendations. For example, the method 600 may include traversing the graph, such as from top to bottom. The top of the graph may be the top of the taxonomy based on the graph according to a first branch-pruning step. As the graph is traversed, a node may be selected 602 and evaluated 604 to determine if a recommendation is defined for that node. If not, the node may be ignored 606 such that no weighting is applied to edges from the node to its immediate parents.

If the recommendation is found 604 to be applicable to the selected node, then the method 600 may include determining 608 the lowest common ancestors (LCA) between the immediate parents (p) of the selected node and the ancestor node (Y) specified in the <ancestor> field of the recommendation. The LCAs may be determined 608 with respect to the initial tree generated at step 406 in the method 400 prior to application of the recommendations. The LCA, or the lowest common ancestor of Y and p, will have a specific depth in the tree. If the depth of the LCA is the same as the depth of Y, then Y is a direct ancestor of p. Where the depth of the LCA is smaller than the depth of Y but is not 0, then there is a common ancestor of Y and p. If the value is 0 (i.e., the LCA is the root node of the initial tree), then Y and p have no common ancestor other than the root node, which is the default common ancestor for any two nodes.

If the recommended ancestor is found 610 to be a direct ancestor of one of the immediate parents of the selected node, then this immediate parent may be assigned 612 to be the preferred parent of the selected node. Assigning 612 an immediate parent as the preferred parent may include applying a high "recommendation weight" to the edge from the selected node to the assigned immediate parent. This recommendation weight would be given high importance during the second iteration of Edmonds' algorithm. In some embodiments, assigning 612 may be strict, such that the assigned immediate parent will be constrained to be the parent of the selected node in the final taxonomy. In other embodiments, recommendations may be overridden by "editorial edges" specifically defined by a user. Likewise, editorial edges may be "beat subtree" edge in that they can override edges weighted according to subtree preferences.

In some instances, multiple immediate parents (p) have the recommended ancestor (Y) as an ancestor. In such instances, various actions may be applied according to developer or user preference. For example, in some instances, all edges having the recommended ancestor as an ancestor may be weighted equally and the branch-pruning algorithm may then choose between the edges based on other weights such as subtree preference weights. In another alternative, one of the immediate parents that is a descendent of the recommended ancestor may be chosen at random. In some embodiments, other weightings may be used to resolve conflicting recommendations, such as weightings according to subtree preferences or editorial weights. For example, if multiple immediate parents have the same weight then the tie may be broken according to random selection. As noted above, the graph is traversed from top to bottom, with the initial tree as modified being used for subsequent levels of the tree. Accordingly, by the time the selected node is processed, the tree has been modified such that it is very likely that all of the candidate parents of the selected node have already chosen their best parents, so their ancestral paths are already accurate.

If the recommended ancestor is not found 610 to be a direct ancestor of an immediate parent of the selected node, then the method 600 may include evaluating 614 whether any of the immediate parents of the selected node have an ancestor, other than the root node, that is also a common ancestor of the recommended ancestor. If so, then the immediate parent having the largest LCA depth with respect to the recommended ancestor may be assigned 616 to be the recommended immediate parent for the selected node. As for the assignment 612, this may include weighting the edge from the selected node to some predetermined value for the recommendation weight (one of the several weights used to label an edge). Selection of an immediate parent that has a common ancestor with the recommended ancestor provides a less suitable option than an immediate parent with the recommended parent as a direct ancestor. However, this approach enables "graceful degradation," inasmuch as a next-best immediate parent is chosen.

If no immediate parent is found 614 to have a common ancestor with the recommended ancestor of the selected node, e.g., the LCA score of all the immediate parents is 0 with respect to the recommended ancestor, then the recommendation for that specific selected node may be ignored 606 and no weighting or constraint needs to be applied to any edges from the selected node to any of its immediate parents based on the recommendation.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for building a taxonomy, the method comprising:

receiving, by a computer, one or more ancestor recommendations;

generating, by the computer, an initial tree from a graph by pruning one or more paths of the graph;

modifying, by the computer, the initial tree according to an evaluation of the initial tree in view of the one or more ancestor recommendations to generate an output tree by applying the one or more ancestor recommendations to each node of at least a portion of nodes of the initial tree having multiple immediate parent nodes in the graph effective to select a single selected immediate parent node for the each node and prune paths to immediate parent nodes of the each node other than the selected immediate parent node, the one or more ancestor recommendations applied effective to obtain a path from the selected immediate parent node within the initial tree to an ancestor node specified in the one or more ancestor recommendations; and outputting, by the computer, responses to queries in accordance with the output tree.

2. The method of claim 1, wherein generating the initial tree from the graph by pruning one or more paths of the graph further comprises performing an optimum branching algorithm.

3. The method of claim 1, wherein generating the initial tree from the graph by pruning one or more paths of the graph further comprises performing an Edmonds algorithm with respect to the graph.

4. The method of claim 1, wherein generating the initial tree from the graph by pruning one or more paths further comprises:

evaluating subtrees within the graph according to one or more subtree preferences; and pruning one or more paths from the subtrees in accordance with the one or more subtree preferences.

5. The method of claim 4, wherein the one or more subtree preferences include a root node definition and a depth from a root node;

wherein pruning one or more paths from the subtrees in accordance with the one or more subtree preferences further comprises:

identifying a node satisfying the root node definition; and applying the one or more subtree preferences to descendent nodes of the root node up to the depth from the root node.

6. The method of claim 4, wherein the one or more subtree preferences include a subtree definition and a recommendation generation definition; and wherein generating the initial tree from a graph by pruning one or more paths of the graph further comprises:

identifying one or more subtrees satisfying the subtree definition; and generating at least a portion of the one or more ancestor recommendations in accordance with the recommendation generation definition for the one or more subtrees.

7. The method of claim 4, wherein the one or more subtree preferences include a subtree definition and one of a positive and a negative preference; and wherein generating the initial tree from a graph by pruning one or more paths of the graph further comprises:

pruning one or more paths of the graph satisfying the subtree definition in accordance with any negative preferences of the one or more subtree preferences; and retaining one or more paths of the graph satisfying the subtree definition in accordance with any positive preferences of the one or more subtree preferences.

8. The method of claim 4, wherein the one or more subtree preferences include a subtree definition, a relationship definition, and one of a positive and a negative preference; and wherein generating the initial tree from a graph by pruning one or more paths of the graph further comprises:

identifying one or more root nodes in the graph satisfying the one or more subtree preferences;

pruning descendent nodes of the one or more root nodes satisfying the relationship definition in accordance with any negative preferences of the one or more subtree preferences; and retaining descendent nodes of the one or more root nodes satisfying the relationship definition in accordance with any positive preferences of the one or more subtree preferences.

9. The method of claim 1, wherein modifying the initial tree according to the evaluation of the initial tree in view of the one or more ancestor recommendations to generate the output tree further comprises performing an optimum branching algorithm with weighting of one or more paths according to the one or more ancestor recommendations.

10. The method of claim 1, wherein modifying the initial tree according to the evaluation of the initial tree in view of the one or more ancestor recommendations to generate the output tree further comprises performing an Edmonds algorithm with weighting of one or more paths according to the one or more ancestor recommendations.

11. The method of claim 1, wherein modifying the initial tree according to the evaluation of the initial tree in view of the one or more ancestor recommendations to generate the output tree further comprises:

for each node of the graph corresponding to at least one ancestor recommendation of the one or more ancestor recommendations:

if an immediate parent of the node in the graph is a descendent of a first ancestor that is in accordance with the at least one ancestor recommendation in the initial tree, selecting the immediate parent as the immediate parent of the node in the output tree.

12. The method of claim 11, further comprising, for each node of the graph corresponding to at least one ancestor recommendation of the one or more ancestor recommendations:

if an immediate parent of the node in the graph is not a descendent of a first ancestor that is in accordance with the at least one ancestor recommendation in the initial tree, selecting for an immediate parent of the node in the output tree, if present, an immediate parent of the node that is a descendent of a second ancestor in the initial tree, the first ancestor being a descendent of the second ancestor.

13. A system for building a taxonomy comprising one or more processors and one or more memory devices operably coupled to the one or more processors, the one or more memory devices storing executable and operational code effective to cause the one or more processors to:

receive one or more ancestor recommendations;

generate an initial tree from a graph by pruning one or more paths of the graph; and modify the initial tree according to an evaluation of the initial tree in view of the one or more ancestor recommendations to generate an output tree by applying the one or more ancestor recommendations to each node of at least a portion of the nodes of the initial tree having multiple immediate parent nodes in the graph effective to select a single selected immediate parent node for the each node and prune paths to immediate parent nodes of the each node other than the selected immediate parent node, the one or more ancestor recommendations applied effective to obtain a path from the selected immediate parent node within the initial tree to an ancestor node specified in the one or more ancestor recommendations.

14. The system of claim 13, wherein the executable and operational code are further effective to cause the one or more processors to generate the initial tree from the graph by pruning one or more paths of the graph by performing an optimum branching algorithm.

15. The system of claim 13, wherein the executable and operational code are further effective to cause the one or more processors to generate the initial tree from the graph by pruning one or more paths of the graph by performing an Edmonds algorithm with respect to the graph.

16. The system of claim 13, wherein the executable and operational code are further effective to cause the one or more processors to generate the initial tree from the graph by pruning one or more paths by:

evaluating subtrees within the graph according to one or more subtree preferences; and pruning one or more paths from the subtrees in accordance with the one or more subtree preferences.

17. The system of claim 16, wherein the one or more subtree preferences include a root node definition and a depth from a root node;

wherein the executable and operational code are further effective to cause the one or more processors to prune one or more paths from the subtrees in accordance with the one or more subtree preferences by:

identifying a node satisfying the root node definition; and applying the one or more subtree preferences to descendent nodes of the root node up to the depth from the root node.

18. The system of claim 16, wherein the one or more subtree preferences include a subtree definition and a recommendation generation definition; and wherein the executable and operational code are further effective to cause the one or more processors to generate the initial tree from a graph by pruning one or more paths of the graph by:

identifying one or more subtrees satisfying the subtree definition; and generating at least a portion of the one or more ancestor recommendations in accordance with the recommendation generation definition for the one or more subtrees.

19. The system of claim 16, wherein the one or more subtree preferences include a subtree definition and one of a positive and a negative preference; and wherein the executable and operational code are further effective to cause the one or more processors to generate the initial tree from a graph by pruning one or more paths of the graph by:

pruning one or more paths of the graph satisfying the subtree definition in accordance with any negative preferences of the one or more subtree preferences; and retaining one or more paths of the graph satisfying the subtree definition in accordance with any positive preferences of the one or more subtree preferences.

20. The system of claim 16, wherein the one or more subtree preferences include a subtree definition, a relationship definition, and one of a positive and a negative preference; and wherein the executable and operational code are further effective to cause the one or more processors to generate the initial tree from a graph by pruning one or more paths of the graph by:

identifying one or more root nodes in the graph satisfying the one or more subtree preferences;

pruning descendent nodes of the one or more root nodes satisfying the relationship definition in accordance with any negative preferences of the one or more subtree preferences; and retaining descendent nodes of the one or more root nodes satisfying the relationship definition in accordance with any positive preferences of the one or more subtree preferences.

21. The system of claim 13, wherein the executable and operational code are further effective to cause the one or more processors to modify the initial tree according to the evaluation of the initial tree in view of the one or more ancestor recommendations to generate the output tree by performing an optimum branching algorithm with weighting of one or more paths according to the one or more ancestor recommendations.

22. The system of claim 13, wherein the executable and operational code are further effective to cause the one or more processors to modify the initial tree according to the evaluation of the initial tree in view of the one or more ancestor recommendations to generate the output tree by performing an Edmonds algorithm with weighting of one or more paths according to the one or more ancestor recommendations.

23. The system of claim 13, wherein the executable and operational code are further effective to cause the one or more processors to modify the initial tree according to the evaluation of the initial tree in view of the one or more ancestor recommendations to generate the output tree by:

for each node of the graph corresponding to at least one ancestor recommendation of the one or more ancestor recommendations:

if an immediate parent of the node in the graph is a descendent of a first ancestor that is in accordance with the at least one ancestor recommendation in the initial tree, selecting the immediate parent as the immediate parent of the node in the output tree.

24. The system of claim 23, wherein the executable and operational code are further effective to cause the one or more processors to, for each node of the graph corresponding to at least one ancestor recommendation of the one or more ancestor recommendations:

if an immediate parent of the node in the graph is not a descendent of a first ancestor that is in accordance with the at least one ancestor recommendation in the initial tree, select for an immediate parent of the node in the output tree, if present, an immediate parent of the node that is a descendent of a second ancestor in the initial tree, the first ancestor being a descendent of the second ancestor.

* * * * *